H H Smith
Mower.
No 2400 Reissued. Nov. 27. 1866.
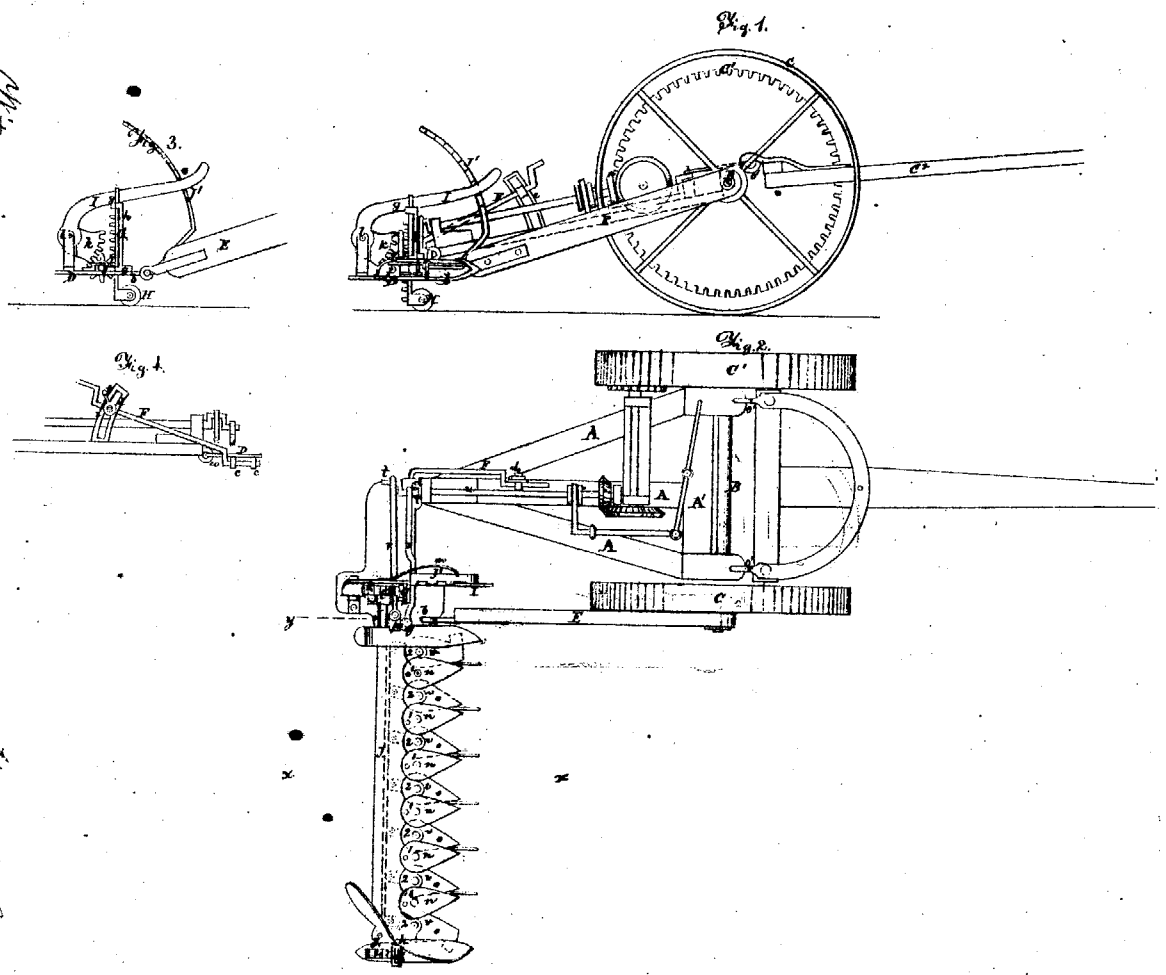
Witnesses
R. Leech
N. B. Smith
Hobart H. Smith
by his Attorney
A. M. Smith

United States Patent Office.

IMPROVEMENT IN HARVESTERS.

HOBART H. SMITH, OF CARLISLE, PENNSYLVANIA, ASSIGNEE BY MESNE ASSIGNMENTS OF C. M. LUFKIN.

DIV. B.

*Letters Patent No.* 18,173, *dated September* 8, 1857; *reissue No.* 2,400, *dated November* 27, 1866.

SPECIFICATION.

TO ALL WHOM IT MAY CONCERN:

Be it known that C. M. LUFKIN, of Acworth, in the county of Sullivan, and State of New Hampshire, invented certain new and useful improvements in Harvesting Machines; and I do hereby declare the following to be a full, clear, and exact description of that part thereof which is embraced in this application, reference being had to the accompanying drawing, making part of the same, in which—

Figure 1 is a transverse section of a harvesting machine embracing said improvements, taken in the line *x x*, fig. 2.

Figure 2 is a plan or top view of the same.

Figure 3 is a transverse section of the finger-bar in line *y y;* and

Figure 4 is a detached view, showing a means for elevating and depressing the points of the cutters.

Similar letters of reference indicate corresponding parts in the several figures.

The improvement embraced in this application consists in combining in a two-wheel, side-draught harvesting machine, a main frame, a hinged cutting apparatus, and a pole or tongue which is hinged at a point within the periphery of the driving-wheel, for the purpose hereinafter specified; and it further consists in combining, in a two-wheel, side-draught machine, a vibrating frame, a tongue hinged to said frame at a point within the periphery of the driving-wheel, and near the axle or gear centre of the machine, and a laterally projecting hinged cutting apparatus, for the purpose hereinafter specified.

To enable others to construct and use said improvement, I will describe, with reference to the drawing, how the same may be carried out in practice.

In said drawing, A is a vibrating main frame, made in a triangular or bracing form, as shown in fig. 2, and connected at one end to and vibrating about the main axle B, upon the opposite ends of which, and outside of frame A, are mounted the two main carrying or supporting wheels C $C^1$, one of which, $C^1$, is also the driving-wheel, which is keyed to and revolves with the main axle B, and from which motion is communicated to the cutters through suitable gearing, arranged on the vibrating frame. D is a finger-bar, which is connected by a hinge at one end to the vibrating end of the frame in such manner as will allow each end of the cutting apparatus to rise and fall independently of the other end, to conform to the surface of the ground over which it is drawn; said hinge consisting, in this instance, of a hook *a*, on the vibrating end of the frame, passing loosely through an eye in the end of bar D; this construction being adapted to allow the freedom of motion in the cutting apparatus above described, and also to admit of the elevation or depression of the points of the cutters as may be desired, or the nature of the work to be performed may require. The connection of the frame with the axle, as above described, is effected by means of lugs or ears on the end of said frame, which are perforated to receive and surround the axle, in such manner as to turn freely thereon, to accommodate the vibrations of the frame and cutting apparatus in passing over and conforming to undulations in the surface of the ground. These lugs or ears are further perforated to form a means whereby the tongue $C^2$ may be hinged to the frame through hooks *o′ o′* on the pole or tongue frame, as shown in figs. 1 and 2 of the drawing; and by this arrangement the line upon which the tongue is hinged to the main frame is made to nearly coincide with the axle on which the frame vibrates, and any tendency on the part of the draught to lift the cutters off the ground is removed, and the necks of the horses are relieved entirely of the weight of the main frame. The construction of the other parts of the machine will be readily understood from the drawings; and being fully set forth in other applications of even date herewith, do not require further description.

The object and advantages of this improvement may be stated as follows, viz: In machines as heretofore constructed, having two wheels and a hinged cutting apparatus, the frame which adapted the cutting apparatus to conform to the surface of the ground, was made to extend each way, in the direction of its length, beyond the periphery of the carrying-wheels; and where one end of the frame was allowed to droop and vibrate, to allow the cutting apparatus attached thereto to rest upon and follow the undulations of the ground over which it was drawn, the other end was necessarily thrown into an elevated position; where the tongue was hinged to the drooping end in the front cut, or to the elevated end in the rear cut machine, the point of attachment, in machines employing a hinged cutting apparatus, being outside of the periphery of the wheel at one end of said frame, was constantly varying its height, and the extended frame acted as a long lever which was operated by the draught of the team, and tended to raise the heel end of the cutting apparatus from the surface of the ground, and thereby to impair the perfect working of the machine where it was desirable or necessary to cut the grass or grain evenly or closely to the ground. Where the cutting apparatus was rigidly connected to the frame, and the entire weight thereof resisted this action of the draught, the difficulty was less apparent, and the grass or grain was cut at the same height at both ends of the cutter, whatever might be the action of the draught. By the construction herein shown and described, the points of attachment of the hinged tongue are on a line nearly coincident with the axle of the main carrying-wheels, and within the periphery of the said wheels, and consequently remain always at the same or nearly the same height from the ground, and the arm of the lever upon which it acts is so shortened that all danger or possibility of raising the hinged or heel end of the cutting apparatus off the ground is removed, and the cutting apparatus is consequently allowed to follow closely and evenly the undulations in the surface of the ground over which it is drawn.

What is claimed herein as the invention of C. M. LUFKIN, and is sought to be secured by Letters Patent, is—

1. The combination, in a two-wheel, side-draught machine, of a main frame, a hinged cutting apparatus, and a draught pole or tongue hinged at a point within the periphery of the driving-wheel, for the purpose specified.

2. The combination, in a two-wheel, side-draught machine, of a vibrating frame, a tongue hinged to said frame, on a line nearly coincident with the axle, and a laterally projecting hinged cutting apparatus, for the purpose specified.

In testimony whereof I have hereunto set my hand this 22d day of October, 1866.

HOBART H. SMITH.

Witnesses:

J. F. GOUCHER,

S. D. HOUSTON.